UNITED STATES PATENT OFFICE.

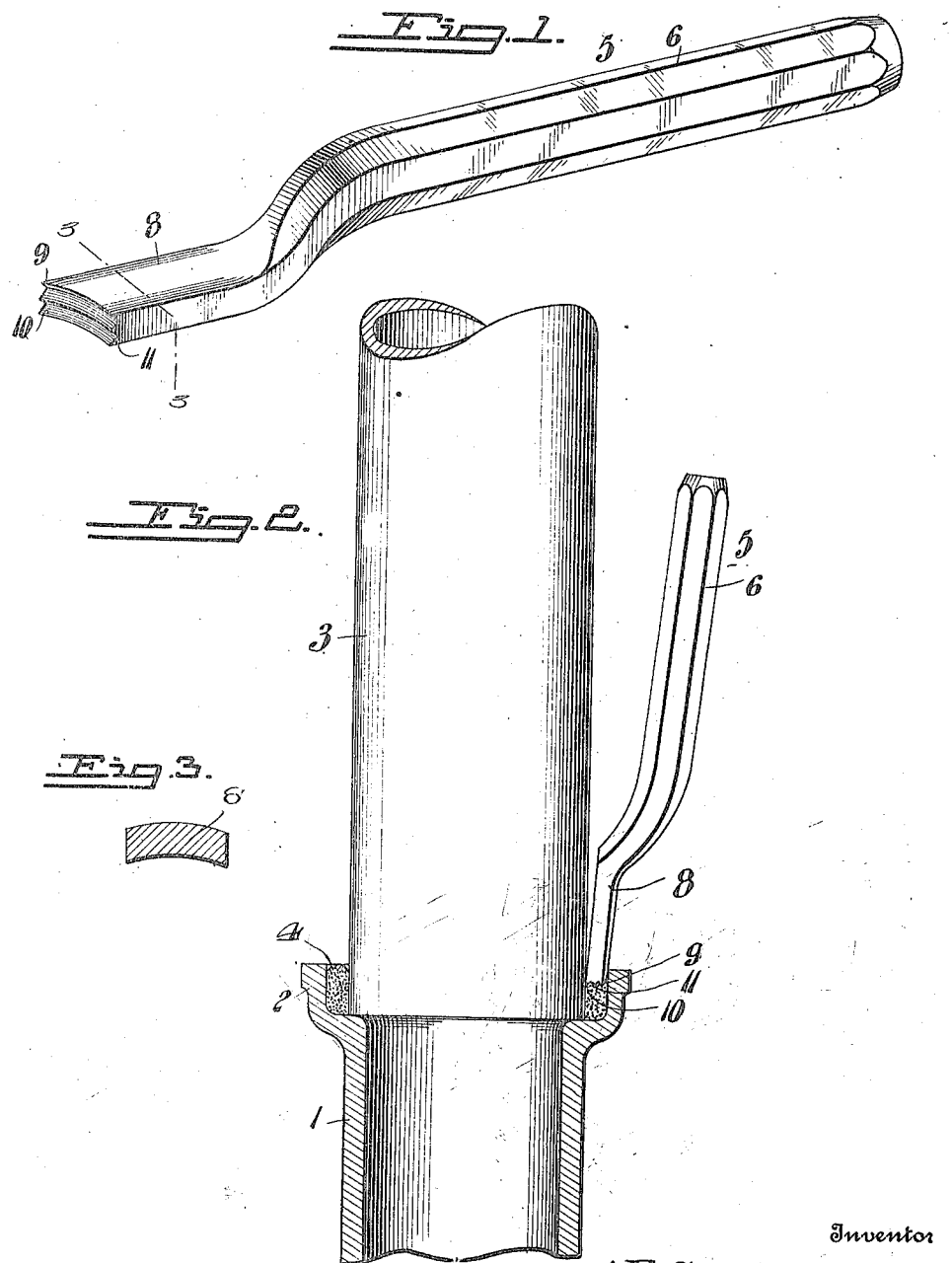

ALVA E. CAMPBELL, OF DECATUR, ILLINOIS.

CALKING-IRON.

1,264,610.  Specification of Letters Patent.  Patented Apr. 30, 1918.

Application filed May 12, 1916. Serial No. 97,129.

*To all whom it may concern:*

Be it known that I, ALVA E. CAMPBELL, a citizen of the United States, residing at Decatur, in the county of Macon and State of Illinois, have invented new and useful Improvements in Calking-Irons, of which the following is a specification.

This invention relates to improvements in tools for calking the joints of pipes.

An object of the invention is to provide a simple, cheap and practical tool which is designed to take the place of the two tools now commonly used in calking iron pipes together with lead to engage one with the inner surface of the joint and the other with the outer surface of the joint and whereby the joint may be made in an expeditious manner and also whereby the lead may be spread to force the same tightly against the hub end of one of the pipes and the end of the other pipe received in the said hub.

With the above and other objects in view the improvement resides in the construction, combination and arrangement of parts set forth in the following specification and falling within the scope of the appended claim.

In the drawing:

Figure 1 is a perspective view of a tool constructed in accordance with the present invention.

Fig. 2 is a sectional view through a joint illustrating the application of the tool.

Fig. 3 is a sectional view approximately on the line 3—3 of Fig. 1.

In the drawing the numeral 1 designates a pipe having a hub or female member 2, and 3 the second pipe which is received in the hub 2 of the pipe 1. The calking member 4 is arranged in the hub to surround the pipe 2, and the numeral 5 designates my improved calking tool. This tool includes a shank or handle 6 having an offset portion adjacent one of its ends which is reduced and is rounded upon its opposite sides to correspond with the outer surface of the pipe 3 and the inner surface of the hub 4. This end of the tool, which, for distinction, I will term the head thereof and which is indicated by the numeral 8, is provided at its end with transverse recesses forming the edges of the same with sharpened portions or teeth 9 and 10. If desired, and as illustrated in the drawing, the said end of the head may be also formed with an intermediate tooth 11 and this tooth is adapted to serve as a spreader element for the calking member 4 to divide the same at the central portion thereof and to force the metal into tight engagement with the outer surface of the pipe 3 and the inner surface of the hub 4, thus providing an effective joint between the pipes 1 and 3. By providing the head 8 with the chisel surfaces or teeth 9 and 10, it will be noted that a single tool may be used in lieu of the two tools usually employed for the inside and outside of the joint.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

A tool for calking pipe joints comprising a shank having an offset straight portion providing a head, said head having one of its faces rounded inwardly and its other face rounded outwardly, the end of the head being grooved transversely to provide inner and outer cutting surfaces, and an intermediate substantially V-shaped tooth.

In testimony whereof I affix my signature in presence of two witnesses.

ALVA E. CAMPBELL.

Witnesses:
HERBERT C. BUSH,
H. D. JOHNSON.